United States Patent [19]

Hickey

[11] 4,321,496
[45] Mar. 23, 1982

[54] DISCOIDAL WINDING COIL STRUCTURE FOR AXIAL GAP DYNAMOELECTRIC MACHINES

[75] Inventor: John S. Hickey, Burnt Hills, N.Y.

[73] Assignee: General Electric Company, Schenectady, N.Y.

[21] Appl. No.: 239,294

[22] Filed: Mar. 2, 1981

[51] Int. Cl.³ .............................................. H02K 9/28
[52] U.S. Cl. .................................... 310/179; 310/268; 310/198; 310/237; 29/598
[58] Field of Search ................. 310/42, 178, 179, 180, 310/195, 198, 208, 237, 268; 29/597, 598

[56] References Cited

U.S. PATENT DOCUMENTS

| | | | |
|---|---|---|---|
| 3,453,468 | 7/1969 | Lund | 310/180 |
| 3,863,336 | 2/1975 | Noto et al. | 29/597 |
| 3,979,620 | 9/1976 | Whiteley | 310/268 |
| 4,020,372 | 4/1977 | Whiteley | 310/61 |
| 4,068,143 | 1/1978 | Whiteley | 310/268 |

*Primary Examiner*—J. D. Miller
*Assistant Examiner*—Donald L. Rebsch

*Attorney, Agent, or Firm*—William H. Steinberg; James C. Davis, Jr.; Marvin Snyder

[57] ABSTRACT

The coil structure for a discoidal winding for use in an axial gap dynamoelectric machine includes a continuously wound substantially flat annular disc portion containing the active coil sides and toroidal-shaped inner and outer ring portions formed by the inner and outer head turn portions respectively for the coil structure. The inner and outer toroidal-shaped ring portions are divided into a plurality of complementary, annular helically-shaped segments that are fitted together to form the complete coil structure having toroidal-shaped inner and outer circumferential ring portions, which define the inner and outer circumferential edges, respectively, of the discoidal winding, separated by the annular disc portion containing the active coil sides. In a preferred arrangement each complementary, annular, helically-shaped segment is itself divided into a number of arcuate sections with each arcuate section having input and output leads that may be electrically interconnected with the leads of adjacent arcuate sections physically juxtaposed to form a complete annular, helically-shaped segment.

12 Claims, 17 Drawing Figures

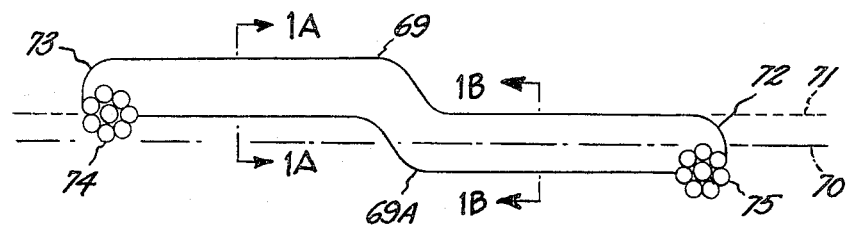
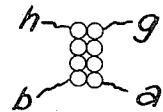 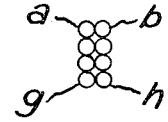
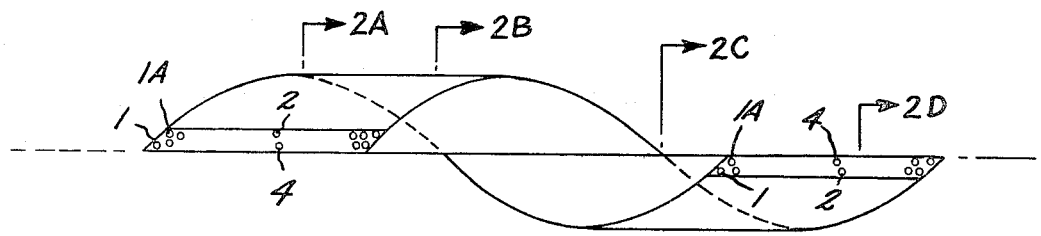
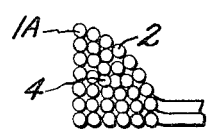 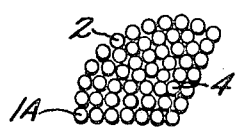 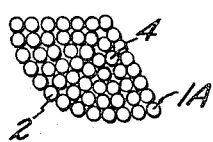 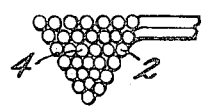

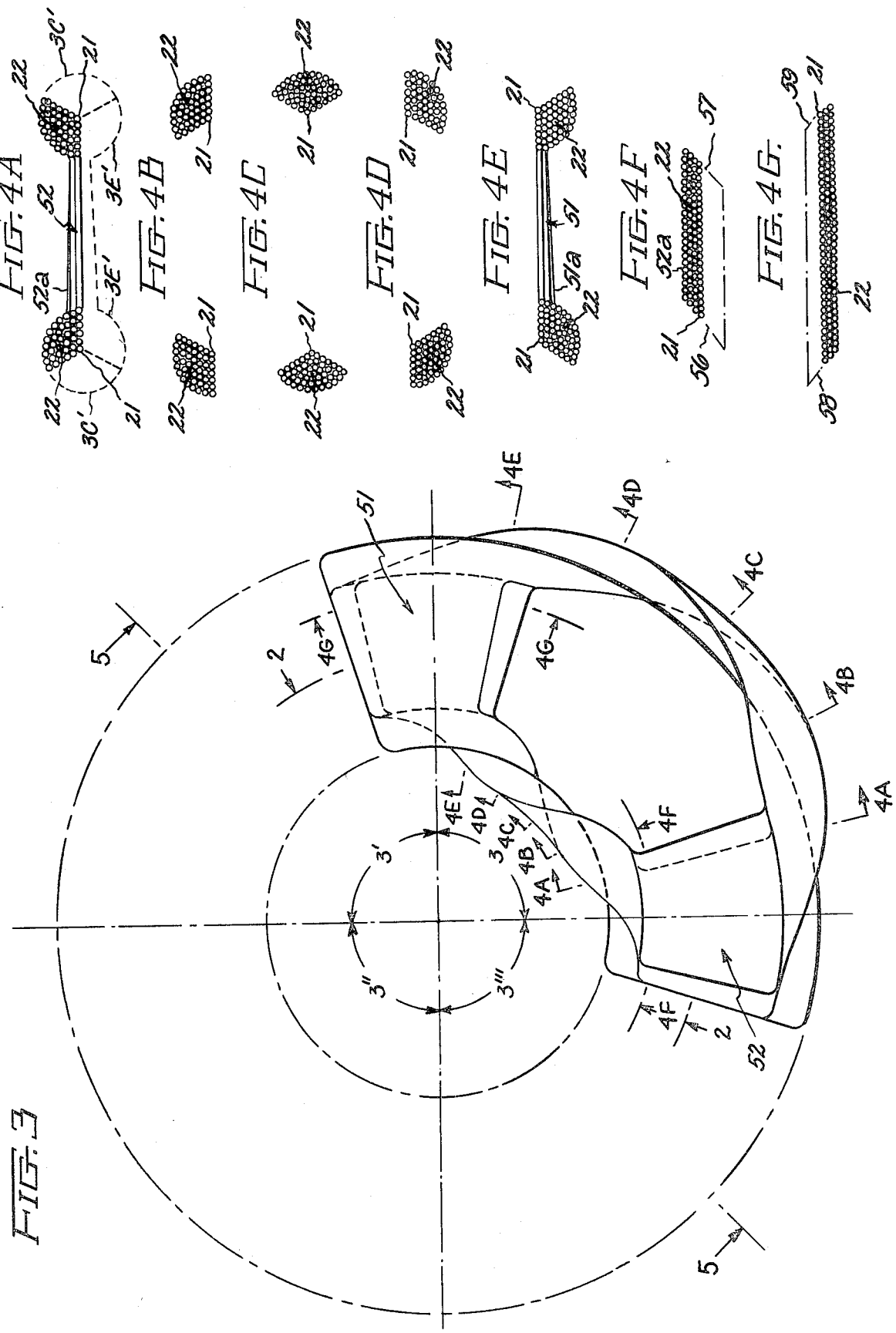

DISCOIDAL WINDING COIL STRUCTURE FOR AXIAL GAP DYNAMOELECTRIC MACHINES

TECHNICAL FIELD

This invention relates to discoidal windings for axial gap dynamoelectric machines, and, in particular, to a coil structure for discoidal windings.

Discoidal winding consist generally of a winding laid out in the form of a flat annular disc that comprises the active coil sides of the winding. The flat annular disc active coil sides terminate in inner and outer end head turns that form inner and outer toroidal rings which define the inner and outer circumferential edges of the discoidal winding. The entire structure may be formed with a single insulated conductor strand which after winding is bonded together with resinous material to form a unitary structure.

BACKGROUND OF THE INVENTION

U.S. Pat. No. 4,068,143, issued Jan. 10. 1978 to Eric Whitely for "Discoidal Winding For Dynamoelectric Machines," assigned to the General Electric Company, and incorporated herein by reference, describes and claims a coil structure for discoidal windings of the type to which the present invention relates. As disclosed in U.S. Pat. No. 4,068,143, the discoidal coil structures known in the art required the use of rather large end head turns. End head turns which are longer or larger than absolutely necessary increase the amount (weight) of conductor in the winding, which increases the $I^2R$ heat losses generated within the winding. The construction of axial gap dynamoelectric machines using such discoidal winding structures is complicated by means for removing the $I^2R$ heat. Additionally, unnecessarily large end head turns waste conductor and resin, increase the size and weight of the discoidal coil winding, and reduce machine efficiency. U.S. Pat. No. 4,068,143 describes a discoidal coil winding structure which alleviates many of the problems encountered with prior art discoidal coil structures. The present invention provides a discoidal coil winding structure to improve machine efficiency.

SUMMARY OF THE INVENTION

It is therefore a primary object of the invention to provide a new and improved discoidal winding coil structure, wherein the size and amount of conductor material used in forming the inner and outer end head turns of the coil structure are reduced to the greatest possible extent, thereby resulting in a discoidal winding coil structure which produces less heat loss and simplifies the construction of axial gap dynamoelectric machines.

The coil structure of the instant invention comprises a continuously wound, substantially flat, annular disc portion containing the active coilsides and toroidal-shaped inner and outer ring portions formed by the inner and outer end head turns, respectively, of the coil structure. The inner and outer toroidal-shaped ring portions define the inner and outer circumferential edges of the discoidal winding and are divided into a plurality of complementary, annular, helically-shaped segments that are interfitted to form the complete coil structure having toroidal-shaped inner and outer circumferential ring portions separated by the annular disc portion containing the active coil sides.

Each of the complementary, annular, helically-shaped segments is comprised of a continuously wound insulated conductor strand. The strand extends across a first substantially flat annular disc portion, turns at the inner or outer edge through a substantially 90° arc and is helically wound with other conductor strand end head turns to form the respective end head turn portion, turns through a second substantially 90° arc, extends across a second substantially flat annular disc portion, turns again through a substantially 90° arc and is helically wound with other conductor strand end head turns to form the respective end head turn portion, turns again through a substantially 90° arc and extends again across the first flat annular disc portion. This pattern is repeated until the active regions in the flat annular disc portions are completely wound.

Each complementary, annular, helically-shaped segment is itself divided into a number of arcuate sections with each arcuate section having input and output leads that may be electrically interconnected with the leads of adjacent arcuate sections physically juxtaposed to form a complete annular, helically-shaped segment. The arcuate sections of all of the annular, helically-shaped segments, preferably are identically formed to allow interfitting at machine assembly resulting in considerable cost savings in fabrication of the sections during manufacture.

Discoidal winding coil structures according to the invention, which are intended for use with multi-phase machines, will have a number of complementary, annular, helically-shaped segments equal to the number of phases employed by the dynamoelectric machine. For example, in three phase, alternating current machines, there would be three complementary, annular, helically-shaped segments employed in forming the discoidal winding. For single phase alternating current and direct current machines, all of the arcuate sections comprising each annular helically-shaped segment would be electrically interconnected.

BRIEF DESCRIPTION OF THE DRAWINGS

Other objects, features and many of the attendant advantages of this invention will become better understood upon a reading of the following detailed description, when considered in connection with the accompanying drawins, wherein in like parts in each of several figures are identified by the same reference character, and wherein:

FIG. 1 is a schematic, partial cross-sectional view of a discoidal winding coil structure constructed according to the prior art as taught by U.S. Pat. No. 4,068,143;

FIGS. 1A and 1B are cross-sectional views taken through planes 1A—1A and 1B—1B of FIG. 1, respectively, in the direction shown by the arrows;

FIG. 2 is a schematic partial cross-sectional view of a discoidal winding coil structure according to the instant invention;

FIGS. 2A, 2B, 2C and 2D are respective cross-sectional views taken through planes 2A, 2B, 2C and 2D of FIG. 2, respectively;

FIG. 3 is a schematic top plan view of an arcuate section of one annular, helically-shaped segment of a discoidal winding coil structure constructed according to the invention;

FIGS. 4A, 4B, 4C, 4D, 4E, 4F and 4G are all schematic cross-sectional views taken through planes 4A, 4B, 4C, 4D, 4E, 4F and 4G of FIG. 3, respectively, in the direction shown by the arrows.

DESCRIPTION OF THE PREFERRED EMBODIMENTS

Figure 5:
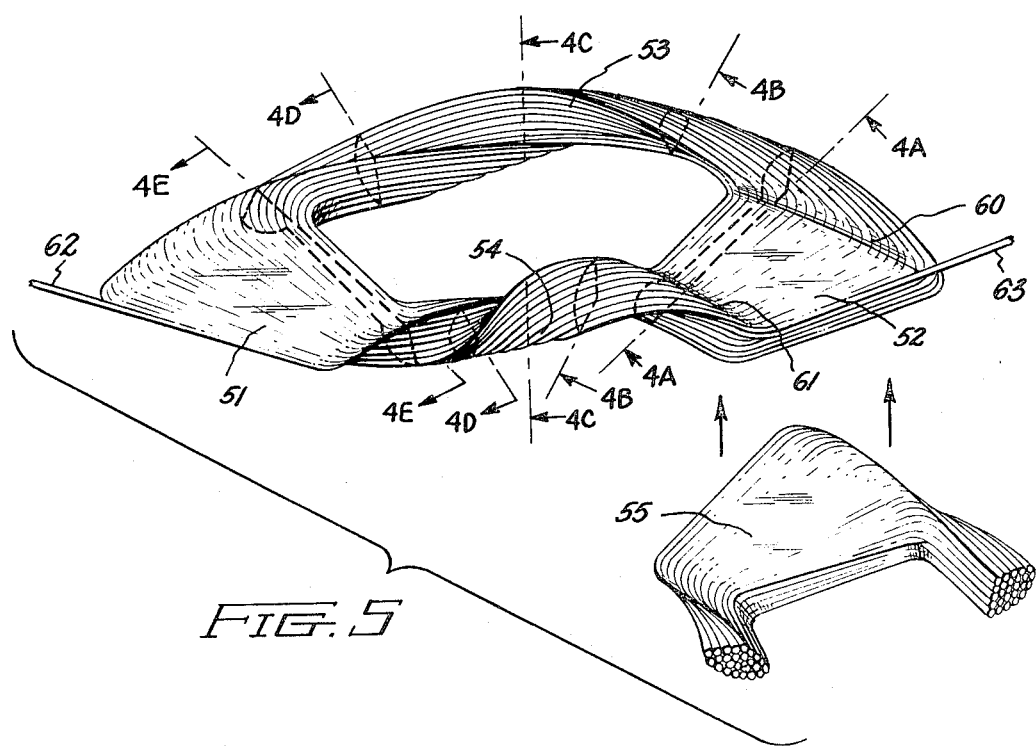
FIG. 5 is a schematic pictorial view of a winding of the instant invention.

FIG. 1 of the drawings is a schematic cross-sectional view of an elemental multi-turn coil which is used in forming the prior art discoidal winding structure described in U.S. Pat. No. 4,058,143 for use in an axial gap AC or DC machine, for example, as shown in FIGS. 1 and 2 of U.S. Pat. No. 4,058,143. The winding structure shown in FIG. 1 consists essentially of a plurality of multiple-turn coils laid in a flat circular array with the coil sides overlapping the coil sides of adjacent multiple-turn coils as shown and described more fully in U.S. Pat. No. 4,068,143. As a result of this construction, the end head turns of each multiple-turn coil is separated into three regions indicated at 73, 69 and 72 in FIG. 1. In the first region from 73 to 69, half of the angular displacement for the end head turn is achieved, in the second region from 69 to 69A a shift is accomplished from the top layer to the bottom layer and in the third region from 69A to 72 the angular displacement is completed. The resulting multiple-turn coil is V-shaped if viewed from above in a plane perpendicular to the plane of the drawing in order that all of the multiple-turn coils will nest together as described more fully with relation to FIG. 3 of U.S. Pat. No. 4,068,143. Several such coils are connected together in series conduit electrical relationship to make each phase belt of a complete winding. FIGS. 1A and 1B are taken through planes 1A—1A and 1B—1B, respectively, of FIG. 1 in the direction of the arrows indicated and show the manner in which the conductor strands a,b–g,h are displaced from a top position in regions 73-69 to a lower position in regions 69A-72 relative to a median plane 71. Cross-sectional views of the active coil sides are shown at 74 and 75 which show the displacement of the two coil sides 74, 75 relative to an average plane 70 so that the coils will properly nest in a minimum size structure. Even after compression of the conductor strands as described in U.S. Pat. No. 4,068,143, a considerable length of wasted copper conductor strand exists in a multiplicity of end head turn portions of all the nested coil structures.

A preferred embodiment of the present invention is shown schematically in FIGS. 2 and 3. The coil structure according to the instant invention is such that the length of conductor strand required to form the end head turn portions of the discoidal winding, both inner and outer, is reduced to a minimum. FIG. 2 is a cross-sectional view taken through a one-quarter arcuate section of an annular, segmented winding structure fabricated according to the invention as shown in solid lines in FIG. 3 of the drawings. The complete annular segmented coil structure for a discoidal winding would include additional one-quarter arcuate sections as indicated at 3', 3'', and 3''' in FIG. 3. While it is possible to fabricate the invention in the form of a complete annular, segmented member as will be described hereinafter, it is preferred to fabricate the complete annular member in four or more arcuate sections as illustrated in FIG. 3. In considering FIG. 3 of the drawings, it should be noted that the annular coil structure there depicted as comprised of four arcuate sections, constitutes only one phase winding of a discoidal winding, which includes two additional phase windings fabricated in exactly the same manner from similar elemental arcuate sections of a coil structure segment to that shown in solid line in FIG. 3.

The elemental, arcuate section of a discoidal winding segmented coil structure shown in FIG. 5 comprises continuously wound, substantially flat annular disc portions 51, 52 formed at each of the ends of the arcuate outer end head turn 53 and inner end head turn 54. FIGS. 4F and 4G of the drawings illustrate the cross section of the active coil sides 51, 52, respectively. The substantially flat, annular disc portions 51, 52 contain the active coil sides which are each mated with another coil side as shown at 55 of the same phase of the resulting discoidal winding after complete assembly. The tapered edges 56, 67 and 58, 59 allow interfitting of coil sides of the respective phases to form a complete generally circular disc. The annular disc portions at each of the inner and outer peripheral edges thereof are turned through approximately 90° as shown at 60 and 61 and form toroidal-shaped inner and outer ring portions, which constitute the inner and outer end head turns of the coil structure. As depicted in FIGS. 4F and 4G, the substantially flat, annular disc portions which comprise the active coil sides of the structure may be double layered, triple layered, or some other multiple layer configuration depending upon the parameters of the machine for which the coil is designed, or may be single layered. Further, the active coil sides have a greater thickness at the radially-inner area 51a, 52a thereof, as shown in FIGS. 4A, 4E and 4F, due to the lesser circumferential dimension.

The inner and outer toroidal-shaped (toroidal-shaped in cross section as shown in FIG. 4A) ring portion defining the inner and outer circumferential edges of the discoidal winding are divided into a plurality of complementary, annular, helically-shaped segments. As shown in FIG. 4A of the drawings, three such segments, indicated at 3C' and 3E' in dotted lines, and by the coil 52 in solid lines, are interfitted to form the complete coil structure having toroidal-shaped inner and outer circumferential ring portions which bound the inner, substantially flat disc portions that comprise the active coil sides of the discoidal winding.

As shown in FIG. 5, each of the arcuate sections of the complementary, annular, helically-shaped segments is formed by a continuously wound, insulated conductor strand. During winding the strand is extended across the substantially flat annular disc portion, e.g., 52, to form an active coil side turn, is turned through a substantially 90° arc at either 61 or 61, and thereafter helically-wound with other conductor strand end turns, as shown at 53 or 54, for example, to form the respective end head turn portion that comprises either the inner or outer toroidal ring portions of the discoidal coil. At the end of the respective first-mentioned end head turn portion, during each winding turn, the conductor strand is again turned through a second substantially 90° arc to extend across the substantially flat annular disc portion comprising the active coil side, e.g., 51, at the opposite end of the arcuate section. From there it is again turned through a substantially 90° arc and again helically-wound with the preceding and successively wound end head turns forming the second end head turn portion (either inner or outer) with the process being repeated during successive winding turns to cause the conductor strand to extend across the substantially flat annular disc portions 51, 52 and the inner and outer end head turn portions 54, 53, alternately, to thereby form the arcuate section of the annular, helically-shaped segment shown in FIG. 3.

The resulting helically segmented coil structure arcuate section is illustrated in the cross-sectional views taken through planes 4A—4A through 4E—4E of FIG. 3, as shown in FIGS. 4A-4E. In viewing these figures, it should be remembered that the substantially flat, annular disc portions containing the active coil sides of each arcuate section, extend only from the solid line edges of sections 51, 52, respectively. Consequently only FIGS. 4A and 4E which are taken through planes 4A—4A and 4E—4E, respectively, of FIG. 3, show two arcuate, partial toroidal coil segments in cross section interconnected by substantially flat disc portions. The intervening FIGS. 4B-4D illustrate how the partial toroidal segmented coil structure arcuate section formed by winding the conductor strand in the above-described manner shifts its arcuate cross-sectional position within a circle (toroid) in a helical fashion. This can best be appreciated by tracing through one or two or the conductor strand winding turns such as shown at 21 and 22 in the cross-sectional views of FIGS. 4A-4G. Starting at the left side of FIGS. 4A-4E, showing end head turn 54 in FIG. 4A, winding turn 22 is above and to the right of winding turn 21. In FIG. 4B, 22 is above and a little to the left of turn 21. In FIG. 4C, 22 is at the same level but to the left of turn 21. In FIG. 4D, 22 is a little below and to the left of turn 21. Winding turn 22 is placed near the center of the partial wedge-shaped torus at the edge of the active coil side 51 and stays near the center until it comes out at the edge of the other active coil side 52. The relative positions of winding turns 21 and 22 are at positions on the right-hand side of FIGS. 4A-4E, representing their positions in end head turn portion 53, which approximately mirror their positions on the left-hand side of FIGS. 4A-4E. It is believed apparent from these drawings that the conductor strand winding turn 22 completely encircles the conductor strand winding turn 21 in the process. As shown in FIG. 4F, strand 21 may be at the outer edge of coil side 52 and at the outer edge of coil side 51, as shown in FIG. 4G, while strand 22 may be located near the center of both coil sides 52 and 51. What is not readily apparent, is that in most practical cases the length of the conductor strand forming the outer end head turns, such as 22, is no greater than, and usually even less in length than, the conductor strand center winding turn 21, since the arcuate length of the toroidal end head turns including strand 22 is less than that including strand 21. In general then, it can be observed that the lengths of conductor strands forming the end head turns near the outside of the coil sides are shorter than, or at least no longer than, the lengths of conductor strands forming turns near the center of the helically-shaped segments, thereby using the least possible length of conductor strand required to form the end head turns.

For a three-phase alternating current machine, the inner and outer toridal ring portions of a complete discoidal winding, as depicted in FIG. 4A of the drawings, are divided into three parts by three helically-shaped dividing planes with each part being formed by one of three arcuate sections interfitted to form the complete toroidal-shaped inner and outer ring portions. In FIG. 4A, the solid line portion of the figure constitutes one of the helically-shaped parts, such as the arcuate sectional member shown in FIG. 3 as taken through plane 4A—4A. The one-third arcuate section indicated by 3C'—3C' on dotted outline form corresponds to that portion of a second helically-shaped, segmented part of a second phase having a cross section such as would be provided by taking a cross section through plane 4C—4C of the second part corresponding to FIG. 3 of the drawings. The portion of the completed discoidal winding depicted by 3E'—3E' of FIG. 4. corresponds to that of a portion of a third helically-shaped, segmented part of a third phase having a cross section similar to a cross section taken through 4E—4E of FIG. 3. In suitably interfitting the three cross-sectional segments in this manner to form the complete toroidal-shaped outer ring portions of the discoidal winding, the substantially flat, active coil side portions of the structures of each phase, which together form the flat, annular disc portion of the completed discoidal winding, would overlap each other in assembly as depicted in FIGS. 4F and 4G of the drawings. As stated earlier, all of the arcuate sections required to make all of the complementary, annular, helically-shaped segments are identically formed so that considerable cost savings can be achieved in the fabrication of the sections.

FIG. 2 of the drawings is a cross-sectional view taken through the arcuate sectional plane 2—2 of FIG. 3 looking in the direction of the arrows toward the inner end head turn 54 of the arcuate section shown in FIG. 3. FIG. 2 considered in conjunction with FIG. 3 illustrates the helical-shape of each arcuate-sectional segment particularly when considered in conjunction with the cross-sectional views shown in FIGS. 2A through 2D taken through planes 2A-2D, respectively, of FIG. 2. As shown, a conductor strand outer winding turn 1A, for example, completely encircles the conductor strand center winding turn 4 while traversing from one end of the end head turn portion to the opposite end thereof.

It is believed to be obvious to one of ordinary skill in the art of coil fabrication, that each arcuate-sectional segment will be provided with input and output leads 70, 71 which will be electrically interconnected in accordance with the use to which the resulting discoidal winding will be placed. For example, if the discoidal winding is to be used as the armature winding of a three-phase alternating current machine, then the four arcuate sections illustrated in FIG. 3 by the solid line drawing segment in conjunction with the dotted line arcuate wedge-shaped segments 3', 3'', 3''' would be connected in series electrical circuit relationship to comprise a single phase winding. The additional two helically-shaped segments required to complete the discoidal winding as described above, likewise would be separately electrically interconnected to form the required two additional phase windings. It is believed obvious that while only a three-phase winding structure has been illustrated and described, additional phase windings can be provided, if needed for a given machine, by carrying through the same concept to provide the number of segmented ring portions for the discoidal windings required for any particular machine configuration in substantially the same manner as described above. Further, if it is desired to form a single phase alternating current discoidal winding, or a discoidal winding for use with a DC machine, the arcuate sections for each segment and the helically-shaped segments all would be electrically connected in series and the three or more segments electrically interconnected in parallel circuit relationship to form the required single phase or DC discoidal winding.

From the foregoing description, it will be appreciated that the invention provides a new and improved discoidal winding coil structure wherein the length of conductor strand required to form the inner and outer end head turns of the coil structure are reduced to the greatest possible extent. This results in a discoidal winding of less weight and cost which produces less heat loss and which is relatively simple and inexpensive to construct. Further, the cost and complexity of axial gap dynamoelectric machines which utilize discoidal windings according to the invention, are reduced.

Having described one preferred embodiment of a discoidal winding constructed in accordance with the invention, it is believed obvious that other variations, changes and additions will be suggested to those skilled in the art in the light of the above teachings. It is therefore to be understood that changes may be made in the particular embodiment of the invention disclosed which are within the full intended scope of the invention as defined by the appended claims.

I claim:

1. An improved coil structure for a discoidal winding having active coil sides and respective inner and outer end head turn portions for use in an axial gap dynamoelectric machine, said coil structure comprising:
   a continuously-wound substantially flat annular disc portion containing first and second active coil sides; and
   toroidal-shaped inner and outer ring portions formed by the inner and outer end head turns, respectively, of said coil structure with the inner end outer toroidal-shaped ring portions defining the inner and outer circumferential edges of the discoidal winding; said inner and outer toroidal-shaped ring portions being divided into a plurality of complementary, helically-shaped segments that are interfitted to form the complete coil structure having toroidal-shaped inner and outer circumferential ring portions separated by said active coil sides.

2. A coil structure according to claim 1 wherein the number of complementary, helically-spaced segments comprising the complementary toroidal-shaped inner and outer ring and interconnected coil sides is a multiple of the number of phases employed by the dynamoelectric machine.

3. A coil structure according to claim 2 wherein the number of complementary, helically-shaped segments is three for a three-phase alternating current dynamoelectric machine.

4. A coil structure according to claim 1 wherein each of the complementary, helically-shaped segments comprises a continuously wound insulated conductor strand which extends across the substantially flat annular disc portion to form a strand of said first active coil side turns through a substantially 90° arc, is helically wound with other conductor stand end head turns to form a first respective arcuate end head turn portion, turns through a second substantially 90° arc, extends across the substantially flat annular disc portion to form a strand of said second active coil side, turns through a third substantially 90° arc, is helically wound with other conductor strand end head turns to form a second respective arcuate end head turn portion, turns through a fourth substantially 90° arc, and extends across said first active coil side, and said first end head turn portion, said second active coil side and said second end head turn portion sequentially to form an arcuate coil structure.

5. A coil structure according to claim 4 wherein the number of complementary, helically-shaped segments comprise the complementary toroidal-shaped inner and outer ring and interconnected flat annular disc portions is a multiple of the number of phases employed by the dynamoelectric machine.

6. A coil structure according to claim 5 wherein the number of complementary, helically-shaped segments is three for a coil structure for use with a three-phase alternating current dynamoelectric machine.

7. A coil structure according to claim 4 further comprising input and output leads for electrically interconnecting the leads of adjacent arcuate sections physically juxtaposed to form a complete, annular winding.

8. A coil structure according to claim 7 wherein the number of complementary, helically-shaped segments comprised of the complementary toroidal-shaped inner and outer ring and interconnected flat annular disc portions is a multiple of the number of phases employed by the dynamoelectric machine.

9. A coil structure according to claim 8 wherein the number of complementary, annular, helically-shaped segments is three for a coil structure for use with a three-phase alternating current dynamoelectric machine.

10. A coil structure according to claim 7 wherein the input and output leads of all the arcuate sections and all of the annular helically-shaped segments are electrically interconnected to form a single winding for use with either single phase alternating current or direct current dynamoelectric machines.

11. A coil structure according to any of claims 7, 8, 9 or 10 wherein the arcuate sections of all annular helically-shaped segments are identically formed.

12. A coil structure according to claim 1 or 4 wherein the annular helically-shaped segments comprising the coil structure all are electrically interconnected to form a single winding for use with either single phase alternating current or direct current dynamoelectric machines.

* * * * *